US010145756B2

(12) United States Patent
Vertoprakhov et al.

(10) Patent No.: US 10,145,756 B2
(45) Date of Patent: Dec. 4, 2018

(54) INSPECTION OF DEFECTS IN A CONTACT LENS

(75) Inventors: Victor Vertoprakhov, Singapore (SG); Soon Wei Wong, Singapore (SG); Tian Poh Yew, Singapore (SG)

(73) Assignee: VisionXtreme Pte Ltd, Singapore (SG)

( * ) Notice: Subject to any disclaimer, the term of this patent is extended or adjusted under 35 U.S.C. 154(b) by 0 days.

(21) Appl. No.: 13/576,012

(22) PCT Filed: Feb. 23, 2011

(86) PCT No.: PCT/SG2011/000073
§ 371 (c)(1),
(2), (4) Date: Mar. 13, 2013

(87) PCT Pub. No.: WO2011/093802
PCT Pub. Date: Aug. 4, 2011

(65) Prior Publication Data
US 2013/0169955 A1     Jul. 4, 2013

(30) Foreign Application Priority Data

Jan. 28, 2010  (SG) .................................. 201000621

(51) Int. Cl.
*G01M 11/02*      (2006.01)
(52) U.S. Cl.
CPC ........ *G01M 11/02* (2013.01); *G01M 11/0214* (2013.01); *G01M 11/0278* (2013.01)
(58) Field of Classification Search
CPC .. G03F 7/706; G03F 7/70591; G03F 7/70133; G01M 11/0228; G01M 11/0235; G01M 11/0257; G01M 11/0242; G01M 11/0278; G01M 11/02

USPC .................................. 356/124, 239.2, 239.1
See application file for complete search history.

(56) References Cited

U.S. PATENT DOCUMENTS

| 5,686,981 | A | 11/1997 | Anan et al. |
| 6,312,373 | B1 * | 11/2001 | Ichihara ............. G01B 11/2441 356/515 |
| 6,437,357 | B1 * | 8/2002 | Weiss et al. ............... 250/559.4 |
| 7,190,443 | B2 * | 3/2007 | Shiode ............... G01M 11/0264 356/124 |

(Continued)

OTHER PUBLICATIONS https://en.wikipedia.org/wiki/Stereo_camera.*

(Continued)

*Primary Examiner* — Tarifur Chowdhury
*Assistant Examiner* — Mohamed K Amara
(74) *Attorney, Agent, or Firm* — Leif R. Sloan; Sonya C. Harris

(57) ABSTRACT

An embodiment of a method and system for inspecting clear and printed contact lenses is provided. A contact lens is inspected by illuminating the contact lens using bright-field illumination and low-angle dark-field illumination simultaneously, when the contact lens is disposed in a cavity between a male mold and a female mold. Further, the light emerging from the contact lens is received by an imaging optical system, and a camera uses the light received by the imaging optical system to capture an image of the contact lens. Further, a data processing system is configured to identify dark defects in the image that are in a first portion of a dynamic range of brightness, and to identify bright defects in the image that are in a second portion of the dynamic range of brightness.

9 Claims, 5 Drawing Sheets

(56) References Cited

U.S. PATENT DOCUMENTS

| | | | |
|---|---|---|---|
| 7,408,631 B2* | 8/2008 | Arnz | G03F 7/70941 355/53 |
| 7,911,624 B2* | 3/2011 | Haidner | G01J 9/02 356/515 |
| 9,569,688 B2* | 2/2017 | Lee | G06K 9/4638 |
| 2002/0001088 A1* | 1/2002 | Wegmann | G01J 9/02 356/521 |
| 2002/0082476 A1 | 6/2002 | Takahashi et al. | |
| 2002/0149745 A1 | 10/2002 | Fukuma et al. | |
| 2003/0068565 A1* | 4/2003 | Ki | G03F 7/70591 430/5 |
| 2003/0098951 A1 | 5/2003 | Hakamata | |
| 2003/0160343 A1* | 8/2003 | Hodgkinson | 264/1.1 |
| 2004/0023130 A1* | 2/2004 | Yao | G03F 7/70591 430/5 |
| 2004/0042003 A1* | 3/2004 | Dispenza et al. | 356/239.1 |
| 2004/0105085 A1* | 6/2004 | Suzuki | G03F 7/70258 355/69 |
| 2007/0139640 A1* | 6/2007 | Biel et al. | 356/124 |
| 2007/0206184 A1 | 9/2007 | Uto et al. | |
| 2008/0204736 A1 | 8/2008 | Chikamatsu et al. | |

OTHER PUBLICATIONS

Hara et al. ("Automating Inspection of Aluminum Circuit Pattern of LSI Wafers", Elec. and Comm. in Japan, Part 2, (70) No. 3, 1987, pp. 46-58).*

International Search Report for Application Serial No. PCT/SG2011/000074, Korean Intellectual Property Office, dated Aug. 16, 2011, pp. 5.

* cited by examiner

INSPECTION OF DEFECTS IN A CONTACT LENS

PRIORITY CLAIM

The present application is a national phase application filed pursuant to 35 USC § 371 of International Patent Application Serial No. PCT/SG2011/000073, filed Feb. 23, 2011 which is incorporated herein by reference in its entirety.

TECHNICAL FIELD

The embodiments herein relate to clear and printed contact lenses, and more particularly but not exclusively to, technique for inspecting printed contact lens.

BACKGROUND

Contact lenses of various types are being manufactured and used for correcting vision, cosmetic purposes and therapeutic purposes, among others. Such contact lenses may be broadly classified as being printed contact lenses or clear contact lenses.

A contact lens, being an object that is worn on the eyes, which are known to be sensitive organs, is manufactured such that it meets a stringent technical specification. To ensure that the contact lenses meet the strict quality requirements of the consumer, they are inspected at various stages of their manufacture.

Traditionally, a contact lens, after being molded, is inspected for defects, using bright-field illumination. FIG. 1 illustrates an image 100 of a clear contact lens, which is taken using bright-field illumination. In the figure, the bright area is the contact lens, and the black dots 102 are bubble defects, or other types of defects, that are present in the clear contact lens. While the bright-field illumination is well suited for inspecting clear contact lenses, such a technique may not be best suited for inspecting printed contact lenses. A printed contact lens has an iris print, and when such lenses are illuminated using bright-field illumination, the image of the printed contact lens will include a black area corresponding to the iris print, and black dots corresponding to bubble or other types of defects. Such an image may not be suited for identifying the defects because the black dots corresponding to the bubble defects may get camouflaged in the black area corresponding to the iris print. Alternatively, if only dark-field illumination is used for inspecting the printed contact lens, the image of the printed contact lens will include bright areas corresponding to the iris print and bright dots corresponding to bubble or other types of defects. Such an image may not be suited for identifying the defects because the bright dots corresponding to the bubble or other similar type of defects may get camouflaged in the bright area corresponding to the iris print. Hence, there is a need in the industry for a system that can reliably identify the defects in a printed contact lens.

Further, in the traditional techniques, during the process of capturing images for defect detection, systems may require one of the molds (male or female) in the mold assembly to be removed to provide access to the inspection system for illuminating the contact lens to perform defect inspection. When the molds are disengaged, there is a possibility of defects being introduced during the disengagement process. Further, when defects are found in the contact lens, it will be difficult to determine if the defects were created during the molding process or during the disengagement process. Hence, there is a need in the industry to understand the process-related defects at the point of their creation, so that appropriate measures can be taken to address the problem.

SUMMARY

In view of the foregoing, an embodiment herein provides a method for inspecting clear and printed contact lenses. The method includes illuminating a contact lens using bright-field illumination and dark-field illumination simultaneously, when the contact lens is disposed in a cavity between a male mold and a female mold. Further, an image of the contact lens is captured using light emerging from the contact lens and entering the imaging optical system. The image is then processed for identifying the existence of defects in the contact lens. The defects are identified by processing the image corresponding to the dark defects that are in a first portion of dynamic range of brightness and bright defects that are in a second portion of the dynamic range of brightness. The dark defects are contamination in the case of a clear lens, and in case of a printed contact lens, the dark detects are contamination and print smear. The bright defects are bubble and similar defects in clear as well as printed contact lenses.

Embodiments further disclose a system for inspecting a contact lens. The system includes an illumination system, an imaging optical system, at least one camera, and a data processing system. The illumination system is configured to illuminate the contact lens using bright-field illumination and dark-field illumination simultaneously, when the contact lens is inside a cavity between a male mold and a female mold. Further, the imaging optical system is configured to receive the light emerging from the contact lens. Further, a camera is configured to capture the image of the entire contact lens using the light entering the imaging optical system. Further, a data processing system is configured to process the image captured by the camera for identifying the existence of one or more defects in the contact lens. The dark defects are identified by processing the image in a first portion of a dynamic range of brightness, and bright defects are identified by processing the image in a second portion of the dynamic range of brightness.

These and other embodiments herein will be better appreciated and understood when considered in conjunction with the following non-limiting description and the accompanying drawings.

BRIEF DESCRIPTION OF THE DRAWINGS

The embodiments herein will be better understood from the following detailed description with reference to the drawings, in which.

DETAILED DESCRIPTION

Figure 1:
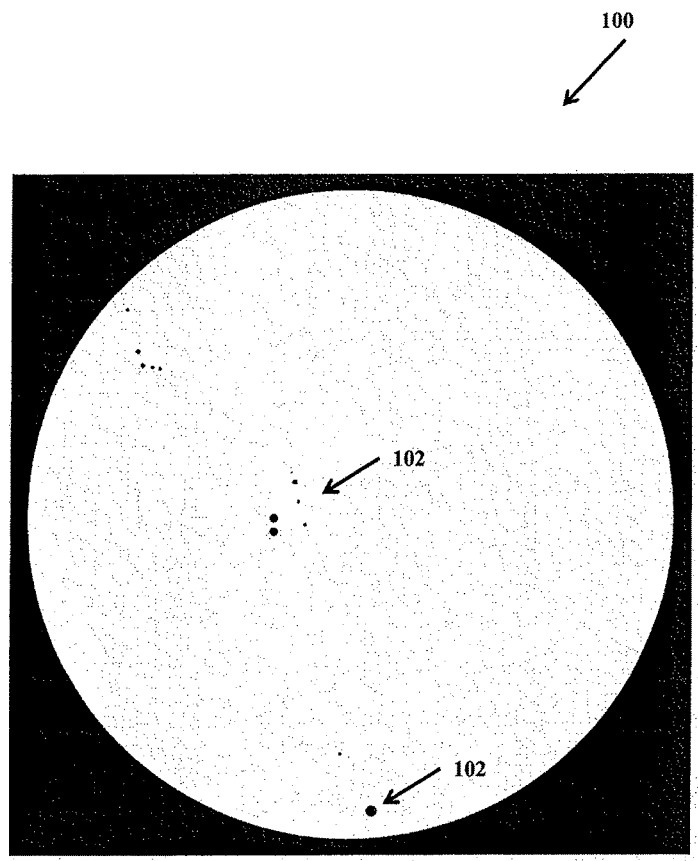
FIG. 1 illustrates an image 100 of a clear contact lens captured using bright-field illumination.

The non-limiting embodiments herein and the various features and advantageous details thereof are explained more fully with reference to the embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced, and to further enable those of skill in the art to practice the embodiments herein. Accordingly, the examples should not be construed as limiting the scope of the embodiments herein, or the scope of this disclosure in general.

The embodiments herein disclose a method and system for inspecting clear and printed contact lenses. Referring now to the drawings, and more particularly to FIGS. 2 through 5, where similar reference characters denote corresponding features consistently throughout the figures, there are shown embodiments. It may be noted that embodiments are described taking a contact lens as an example. However, one, in light of this disclosure, may make modifications, which are within the scope of the disclosure, to enable inspection of other transparent objects.

System Description

Figure 3:
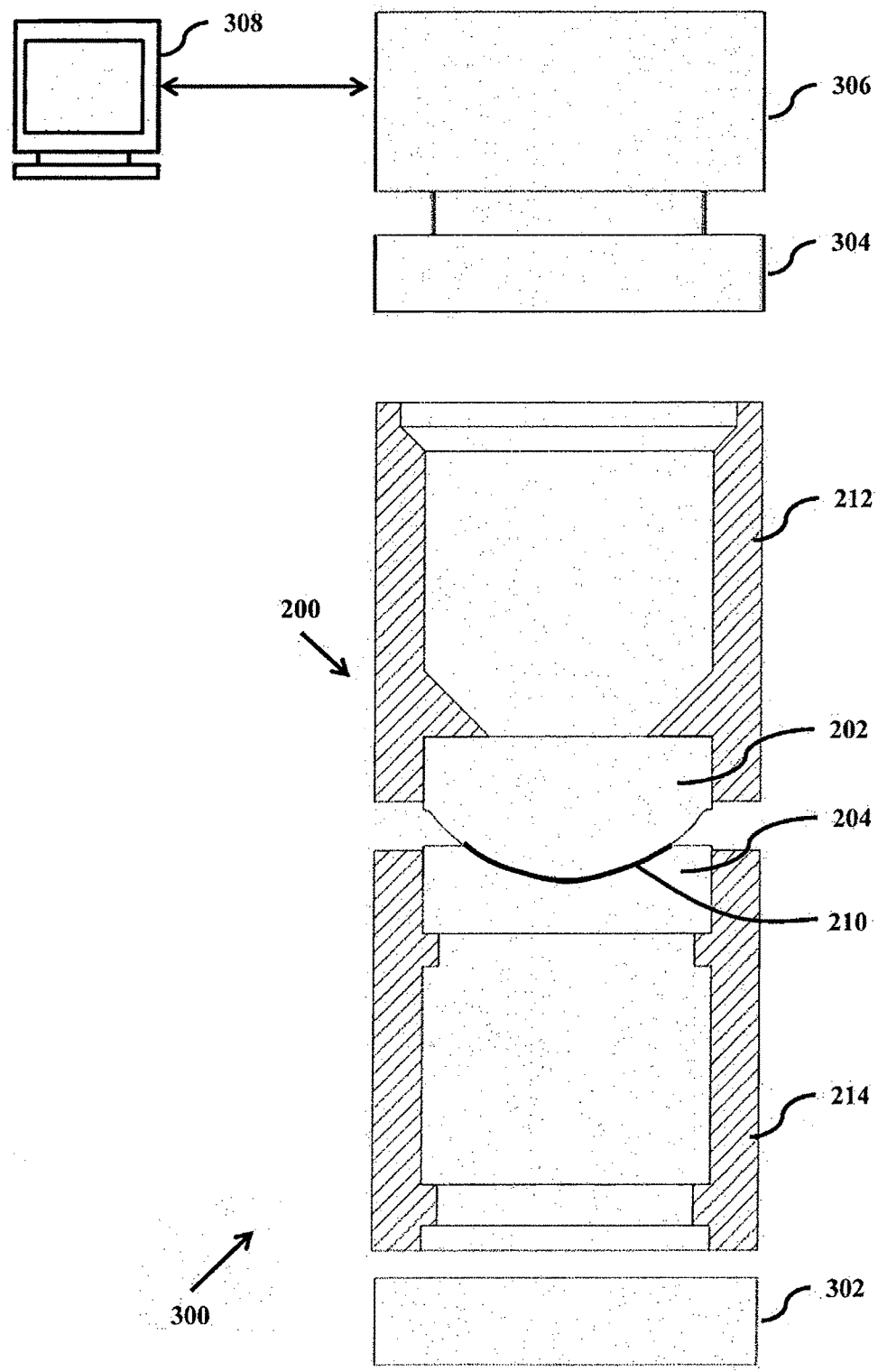
FIG. 3 illustrates a system 300 for inspecting clear or printed contact lenses inside a mold, in accordance with an embodiment.

FIG. 3 illustrates a system 300 for inspecting clear or printed contact lenses, in accordance with an embodiment. System 300 includes an illumination system 302, an imaging optical system 304, a camera 306, and a Data Processing System (DPS) 308. The system enables inspection of a contact lens 210 that is disposed in a mold assembly 200.

Mold Assembly

Figure 2:
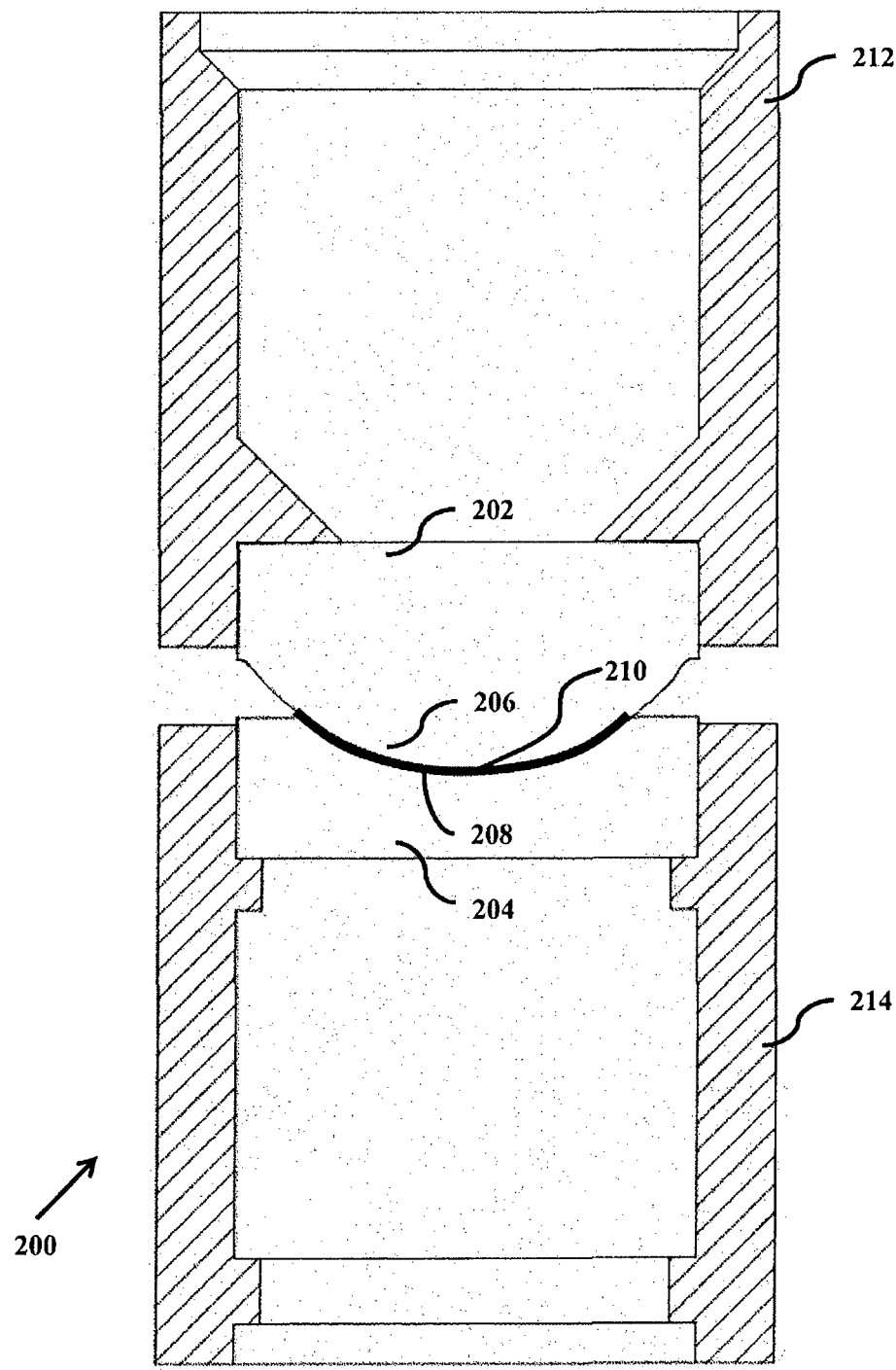
FIG. 2 illustrates a mold assembly 200, in accordance with an embodiment.

FIG. 2 illustrates the mold assembly 200, in accordance with an embodiment. The mold assembly 200 includes a male mold 202 and a female mold 204. A portion of each of the molds corresponding to the cavity between the male mold 202 and female mold 204 is transparent. The male mold 202 is coupled with a case 212, and the female mold 204 is coupled with a case 214. Further, the male mold 202 has a curved surface 206, and the female mold 204 has a curved surface 208, such that, when the mold assembly 200 is in an engaging position, as shown in FIG. 2, the curved surfaces 206 and 208 define a cavity corresponding to the shape of the contact lens 210 to be molded. The contact lens 210 is manufactured by molding contact-lens material in the cavity. Further, the mold assembly 200 can assume a disengaging position (not shown in the figure), enabling retrieval of the molded contact lens 210.

Illumination System

The illumination system 302 (FIG. 3) is configured to illuminate the contact lens 210, which is disposed between the male mold 202 and female mold 204 of the mold assembly 200. The illumination system 302 illuminates the contact lens 210 by providing bright-field illumination and dark-field illumination simultaneously. In an embodiment, the illumination system 302 includes two parts. The first part of the illumination system is configured to provide direct light rays 402 (illustrated in FIG. 4) to illuminate the contact lens using bright-field illumination. The second part of the illumination system 302 is a ring-type light head that directs light rays, which may be referred to as angular light rays 404 (illustrated in FIG. 4), angularly into the inner surface of the case 214. The angular light rays 404 that are incident on the inner surface of the case 214 are reflected and scattered by the inner surface of the case 214 and fall on the contact lens 210 at low angles to provide dark-field illumination.

Imaging Optical System

The imaging optical system 304 is configured to receive the light emerging from the contact lens 210 as a result of bright-field illumination and dark-field illumination.

Camera

The camera 306 is configured to use the light entering the imaging optical system to capture images of the contact lens 210. The camera 306 may be a digital camera.

Data Processing System (DPS)

The DPS 308 is configured to receive data corresponding to the image of the contact lens 210 captured by the camera 306. Further, the DPS 308 processes the image of the contact lens 108 to identify defects in the contact lens 210.

System Configuration

Figure 4:
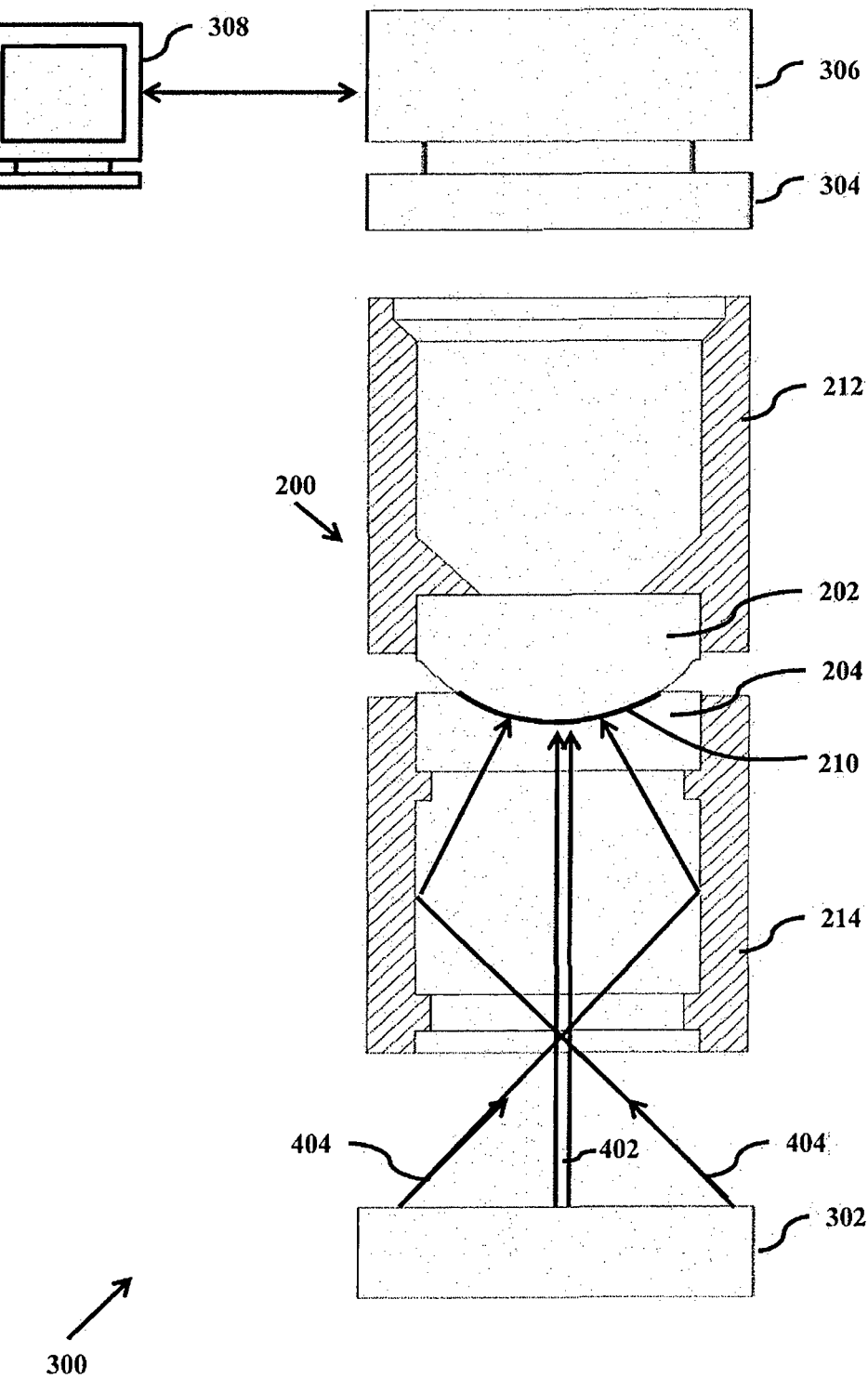
FIG. 4 illustrates the path of the light from the illumination system to the clear or printed contact lens, in accordance with an embodiment.

In an embodiment, as illustrated in FIGS. 3 and 4, illumination system 302 is located on a first side of the mold assembly 200, such that, the illumination system 302 is proximate to the female mold 204 as compared to the male mold 202. The illumination system 302 is positioned in such a way that light from the illumination system 302 is directed towards the contact lens 210. While the illumination system 302 is located on the first side of the mold assembly 200, the imaging optical system 304 and the camera 306 are located on the second side of the mold assembly 200. The imaging optical system 304 is located in between the camera 306 and the mold assembly 200.

Inspecting a Contact Lens

In an embodiment, a clear or a printed contact lens 210 is inspected when the mold assembly 200 is in the engaging position, which means that the contact lens 210 is disposed in a cavity between the male mold 202 and female mold 204. While the contact lens 210 is disposed between the molds, the illumination system 302 emits direct light rays 402 and angular light rays 404 that fall on the contact lens 210. FIG. 4 illustrates paths taken by light rays from the illumination system 302, in accordance with an embodiment. Direct light rays 402 providing bright-field illumination are emitted by the first portion of the illumination system 302. And angular light rays 404 resulting in dark-field illumination are emitted by the second portion (ring-type light head) of the illumination system 302, travel at an angle, and fall on the inner surface of the case 214 of the female mold 204. The angular light rays 404 are reflected by the inner surface of the case 214 and fall on the contact lens 210 at low angles, thereby providing dark field illumination. Further, it may be noted that intensity of the direct light rays 402 and the angular light rays 404 may be adjusted so that an image that is desirable for inspecting the contact lens 210 is obtained. Further, the light emerging from the contact lens 210 is captured by the imaging optical system 304. The light received by the imaging optical system 304 is used by the camera 306 to capture at least one image of the contact lens 210.

Figure 5:
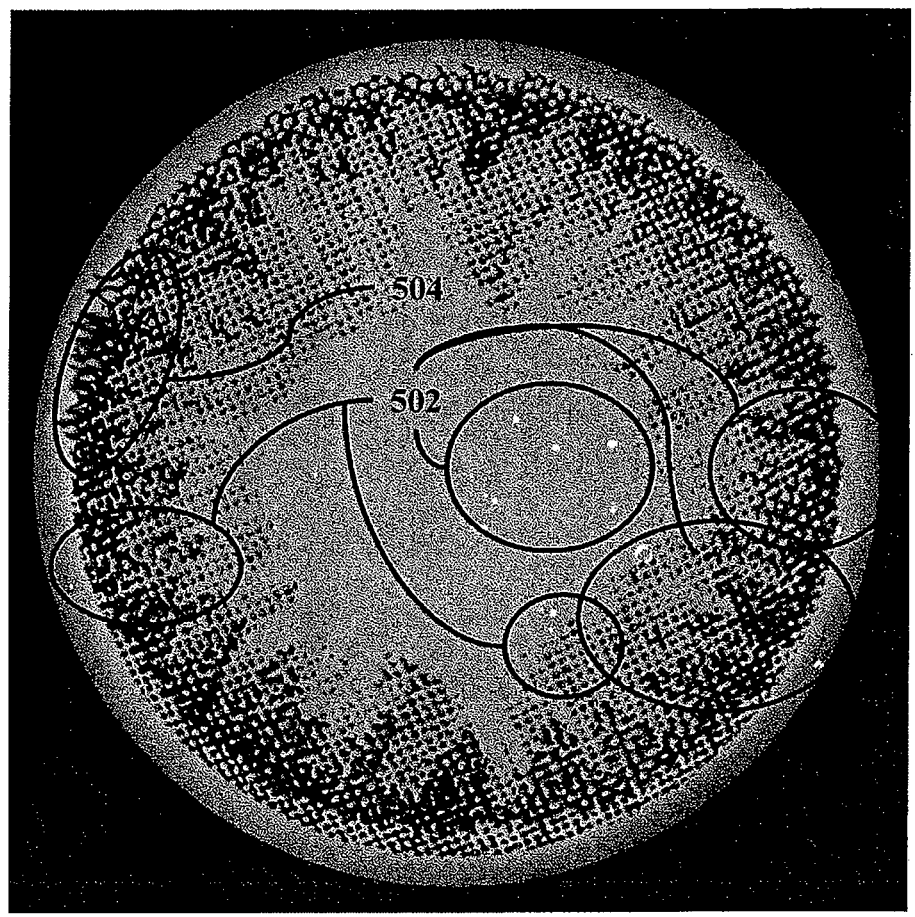
FIG. 5 illustrates an image 500 of a printed contact lens 210, in accordance with an embodiment.

FIG. 5 illustrates an image 500 of a printed contact lens 210, in accordance with an embodiment. In the image 500, it may be seen that portions of the image corresponding to clear part of the contact lens, iris print on the contact lens, and bubble and other similar defects have significantly different brightness levels. In an embodiment, if the dynamic range of brightness of the image 500 that can be captured by the camera 306 is 255 grayscale levels, then a portion of the image corresponding to the iris print has a brightness in a first portion of the dynamic range of brightness, wherein the first portion could be between 0 and 140 grayscale levels, for example. In image 500, print smear 504 that has been encircled can be clearly distinguished. Print smears can be classified as dark defects. Contamination in the case of a clear lens and a printed contact lens can also be classified as dark defects. Further, the portion of the image corresponding to a clear part of the printed contact lens and the bubble detects 502 has a brightness in a second portion of the dynamic range of brightness, wherein the second portion could be between 141 and 255 grayscale levels, for example. In image 500, bubble defects 502 that have been encircled can be clearly distinguished. Bubbles and similar defects can be classified as bright defects that appear in clear as well as the printed contact lens. It may be further noted that bright defects such as bubbles and similar defects 502 that are present in the print area are also clearly distinguishable, as seen in FIG. 5. The difference in brightness of the portions of the image corresponding to a clear part of the contact lens, an iris print on the contact lens, and bubbles and other similar defects, enables the DPS 308 to process the image 500 and identify defects.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described particularly, those skilled in the art will recognize that the embodiments herein can be practiced with modification within the spirit and scope of this disclosure as described herein.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

What is claimed is:

1. A method for inspecting contact lenses for bright defects and dark defects with a single camera, the method comprising:
   providing an illumination system;
   providing an imaging optical system;
   providing the single camera;
   providing a mold assembly having a first side and an opposing second side, between which the mold assembly comprises:
      a male mold having a first curved surface disposed in an engaging position with a female mold having a second curved surface; and
      a cavity disposed between the first curved surface of the male mold and the second curved surface of the female mold; and
      a contact lens manufactured within the cavity while the male mold and the female mold are in the engaging position;
   while the male mold and the female mold remain in the engaging position, disposing the mold assembly with the contact lens manufactured in the cavity thereof between the illumination system and the imaging optical system such that the first end of the mold assembly is disposed toward the illumination system and the second end of the mold assembly is disposed toward the imaging optical system;
   illuminating the contact lens within the cavity while the male mold and the female mold are in the engaging position by:
      providing brightfield illumination incident upon the contact lens by emitting first illumination from a first portion of the illumination system toward the first side of the mold assembly and into the mold assembly along a direct path from the first portion of the illumination system onto the contact lens; and
      providing darkfield illumination incident upon the contact lens simultaneous with providing the brightfield illumination incident upon the contact lens by (a) emitting second illumination from a second portion of the illumination system toward the first side of the mold assembly, into the mold assembly, and onto an inner surface of the mold assembly, and (b) reflecting and scattering the second illumination off of the inner surface of the mold assembly and onto the contact lens, wherein the second portion of the illumination system comprises a ring-type light head that directs light angularly toward the first side of the mold assembly and into the inner surface of the mold assembly;
   transmitting the brightfield illumination incident upon the contact lens through the contact lens simultaneous with transmitting the darkfield illumination incident upon the contact lens through the contact lens, such that brightfield illumination and darkfield illumination simultaneously emerge from the contact lens;
   simultaneously outputting from the second side of the mold assembly brightfield illumination and darkfield illumination that simultaneously emerged from the contact lens;
   simultaneously receiving the brightfield illumination and the darkfield illumination output from the second side of the mold assembly at the imaging optical system;
   simultaneously passing the brightfield illumination and the darkfield illumination received by the imaging optical system through the imaging optical system;
   simultaneously capturing with the single camera the brightfield illumination and the darkfield illumination that passed through the imaging optical system to thereby capture an image of the contact lens, wherein the image is processable to identify dark defects and bright defects in the contact lens; and
   inspecting the contact lens for defects with a data processing system by:
      performing a first image processing sequence comprising processing the image captured by the camera in a first portion of a dynamic range of brightness to identify dark defects in the contact lens; and
      performing a second image processing sequence distinct from the first image processing sequence comprising processing the image captured by the camera in a second portion of the dynamic range of brightness distinct from the first portion of the dynamic range of brightness to identify bright defects in the contact lens, wherein the image processed by the first image processing sequence in the first portion of the dynamic range of brightness to identify dark defects and the image processed by the second image processing sequence in the second portion of the dynamic range of brightness distinct from the first portion of the dynamic range of brightness to identify bright defects is the same image.

2. The method according to claim 1, wherein processing the image comprises classifying the dark defects as contamination when the contact lens is a clear lens and as contamination and print smear when the contact lens is a printed contact lens.

3. The method according to claim 1, wherein processing the image comprises classifying the bright defects as bubbles.

4. The method of claim 1, wherein each of the male mold and the female mold includes a transparent portion corresponding to the cavity between the male mold and the female mold.

5. A system structurally designed for inspecting contact lenses for bright defects and dark defects with a single camera, the system comprising:

a mold assembly having a first side, and opposing second side, and a cavity corresponding to the shape of a contact lens and within which a contact lens has been manufactured between a male mold having a first curved surface and a female mold having a second curved surface that together define the cavity while the male mold and the female mold are in an engaging position;

an illumination system structurally designed to illuminate the contact lens by providing brightfield illumination to the contact lens simultaneous with providing darkfield illumination to the contact lens within the cavity of the mold assembly while the male mold and the female mold remain in the engaging position, wherein the illumination system when activated is structurally designed to:

provide brightfield illumination incident upon the contact lens by emitting first illumination from a first portion of the illumination system toward the first side of the mold assembly and into the mold assembly along a direct path from the first portion of the illumination system into the contact lens; and provide darkfield illumination incident upon the contact lens simultaneous with providing brightfield illumination incident upon the contact lens by (a) emitting second illumination from a second portion of the illumination system toward the first side of the mold assembly, into the mold assembly, and onto an inner surface of the mold assembly, and (b) reflecting and scattering the second illumination off of the inner surface of the mold assembly and onto the contact lens, wherein the second portion of the illumination system comprises a ring-type light head that directs light angularly into the inner surface of the mold assembly;

an imaging optical system structurally designed to simultaneously receive at an input side of the imaging optical system the brightfield illumination and the darkfield illumination that emerged from the contact lens and which was output from the second side of the mold assembly as a result of the illumination of the contact lens, and simultaneously pass at an output side of the imaging optical system brightfield illumination and darkfield illumination therethrough;

the single camera, wherein the single camera is structurally designed to simultaneously capture at an image capture side brightfield illumination and darkfield illumination that passed through the imaging optical system to capture an image of the contact lens, wherein the image is processable to identify dark defects and bright defects in the contact lens; and a data processing system structurally designed to identify each of dark defects and bright defects in the contact lens by:

performing a first image processing sequence comprising processing the image captured by the camera in a first portion of a dynamic range of brightness for identifying dark defects in the contact lens; and performing a second image processing sequence distinct form the first image processing sequence comprising processing the image captured by the camera in a second portion of the dynamic range of brightness distinct from the first portion of the dynamic range of brightness for identifying bright defects in the contact lens, wherein the image processed in the first portion of the dynamic range of brightness to identify dark defects and the image processed in the distinct second portion of the dynamic range of brightness to identify bright defects is the same image.

6. The system according to claim 5, wherein the illumination system is configured for illuminating the contact lens while the male mold and the female mold are in the engaging position and the contact lens is disposed in the cavity between the male mold and the female mold.

7. The system according to claim 5, wherein the data processing system classifies the dark defects as contamination when the contact lens is a clear lens and as contamination and print smear when the contact lens is a printed contact lens.

8. The system according to claim 5, wherein the data processing system classifies the bright defects as bubbles.

9. The system of claim 5, wherein each of the male mold and the female mold includes a transparent portion corresponding to the cavity between the male mold and the female mold.

* * * * *